Figure 1:
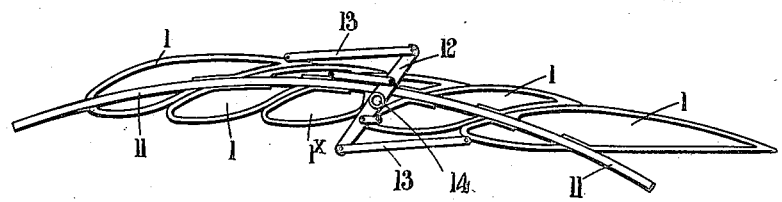

F. H. PAGE.
WING FOR AIRCRAFT.
APPLICATION FILED MAY 14, 1921.

1,433,030.

Patented Oct. 24, 1922.

INVENTOR
Frederick Handley Page

Patented Oct. 24, 1922.

1,433,030

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING FOR AIRCRAFT.

Application filed May 14, 1921. Serial No. 469,402.

*To all whom it may concern:*

Be it known that I, FREDERICK HANDLEY PAGE, a subject of the King of Great Britain, residing at London, England, have invented certain new and useful Improvements in Wings for Aircraft, of which the following is a specification.

In the specification of United States Patent No. 1353666, dated 21st September 1920, an invention has been described in which a slot or slots is or are formed in the leading portion of a wing extending in a direction transverse to the direction of flight, in order to admit of the passage of air from the under side to the upper side, so as to prevent the burbling effect which takes place with wings when inclined to the air at a large angle of incidence, and by prevention of that burbling permitting the wings to be flown at still greater angles, and greatly improved lift coefficient being thereby obtained.

In a wing having slots of this kind, the wing has been considered as composed of a main wing and one or more auxiliary wings set in front of the leading edge thereof, and it has been stated in the specification that the auxiliary wings are set at a less angle of incidence than the main wings. Thus if there is a difference in angle of 30° between the chord of the main wing and the chord of the auxiliary wing, and the main wing happens to be at an angle of incidence of plus 10°, then the angle of incidence of the auxiliary wing would be minus 20°.

According to the present invention a wing structure for aircraft is composed of a plurality of wing sections each of wing form extending transversely to the longitudinal axis of the machine, one wing section being located rearward of the other from the leading edge to the trailing edge of said wing structure; a plurality of curved rails are provided, extending transversely of said wing sections, and one of said wing sections is fixed to the said rails. Means are then provided for slidably connecting the other wing sections composing the wing structure to the said curved rails, to permit said slidable wing sections to be slidden upon said curved rails.

Means are also provided for sliding said movable wing sections upon said rails relatively to said fixed wing section and to each other, to cause said wing scetions to be brought into contact with each other or to be separated from each other to form comparatively narrow through slots between the said wing sections, each slot extending in a direction transversely of the line of flight, and when so separated to cause said wing structure to be of greater chord than when said wing sections are in contact with each other and said slots closed. When said wing sections are separated from each other, the openings of said slots on the under side of the wing structure are in advance of the openings of said slots on the upper side of the wing structure, all such wing sections whether closed together or separated combining to make up the contour of a whole wing structure, in which portions of the surfaces of each wing section are contained in the contour line surrounding said wing structure.

The term "wing section" is to be understood as a wing of comparatively high aspect ratio having leading and trailing edges, while the term "wing structure" used in this specification is to be understood as a structure comprising two or more of such wing sections arranged in tandem from the leading edge to the trailing edge of the wing structure, and all the said wing sections, whether separated to produce the aforesaid slots, or brought together to close the same, combine to make up the contour of a whole wing structure.

This wing structure may be regarded, when its wing sections are separated, as a multiple wing structure, with the limitation that each wing section is so placed relatively to the other wing sections that it influences and is influenced by them, and each wing section is masked by the wing section immediately preceding it, and is also at a greater angle of incidence than the wing sections preceding it. Thus in a wing divided into say five wing sections the leading section may be at an angle of say minus 40° the next section at minus 25° the next at minus 10° the next at plus 5° and the last at plus 20°. These examples of relative angles of incidence are given not as suitable relative angles of the wing sections but as an explanation of the terms referred to.

Figure 2:
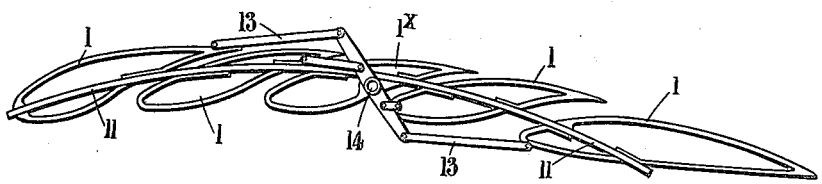

The invention will be further described with reference to the accompanying drawings. Figs. 1 and 2 are views showing a construction in which the wing sections are so mounted in the wing structure as to permit of angular adjustment simultaneously with bodily displacement of the wing sections.

Referring to the drawings, the wing sections 1 are slidable in direction with the longitudinal axis of the machine upon a plurality of parallel curved rails 11, and one of the wing sections 1× is fixed upon the rails, in the construction shown such a wing section 1× being the central wing section. The wing section 1× carries pivoted thereto, a two-armed lever 12, to the arms of which connecting rods 13 are pivoted, extending forwardly from the upper arm of the lever 12 and rearwardly from the lower arm of the lever 12, the ends of the rods 13 being pivotally connected near the trailing edges of the wing sections 1 forward of the lever 12, and being pivotally connected near the leading edges of the wing sections 1 rearward of the lever 12. Obviously there may be a plurality of such levers 12, and whether there is one lever 12 or a plurality, said lever or levers is or are mounted upon a shaft 14, by the angular adjustment of which shaft 14 the wing sections 1 will be slidden on the curved rails 11 from the position shown at Fig. 1 where the wing sections are in contact with each other, to the position at Fig. 2 where the wing sections are separated to form slots between themselves and also where the chord of the wing structure is increased.

What I claim as my invention and desire to secure by Letters Patent is:—

1. A wing structure for aircraft, comprised by a plurality of wing sections each of wing form and all extending transversely to the direction of flight, one located rearward of the other from the leading edge to the trailing edge of said wing structure, a plurality of curved rails extending transversely of said wing sections, means for fixing one of said wing sections to said rails, means for slidably connecting the other wing sections composing the wing structure to said curved rails to permit said slidable wing sections to be slidden upon said curved rails, and means for sliding said movable wing sections upon said rails relatively to said fixed wing section and to each other to cause said wing sections to be brought into contact with each other or to be separated from each other to form comparatively narrow through slots between said wing sections each slot extending in a direction transversely of the line of flight and when so separated to cause said wing structure to be of greater chord than when said wing sections are in contact with each other and said slots closed, the openings of said slots on the under side of said wing structure being located in advance of the openings of said slots on the upper side of said wing structure, all said wing sections whether closed together or separated being contained within contour lines of wing forms surrounding said wing structure.

2. A wing structure for aircraft, comprised by a plurality of wing sections each of wing form and all extending transversely to the direction of flight, one located rearward of the other from the leading edge to the trailing edge of said wing structure, a plurality of curved rails extending transversely of said wing sections, means for fixing one of said wing sections to said rails, means for slidably connecting the other wing sections composing the wing structure to said curved rails to permit said slidable wing sections to be slidden upon said curved rails, and a two-armed lever, a pivot connecting said two-armed lever to said fixed wing section, connecting rods pivoted to the upper arm of said two-armed lever and pivoted to the trailing edges of said wing sections forward of said lever, and connecting rods pivoted to the lower arm of said two-armed lever extending rearwardly and pivoted to the leading edges of said wing sections rearward of said two-armed lever for sliding said movable wing sections upon said rails relatively to said fixed wing section and to each other to cause said wing sections to be brought into contact with each other or to be separated from each other to form comparatively narrow through slots between said wing sections each slot extending in a direction transversely of the line of flight and when so separated to cause said wing structure to be of greater chord than when said wing sections are in contact with each other and said slots closed, the openings of said slots on the under side of said wing structure being located in advance of the openings of said slots on the upper side of said wing structure, all said wing sections whether closed together or separated being contained within contour lines of wing forms surrounding said wing structure.

In witness whereof I have hereunto set my hand in the presence of two witnesses.

FREDERICK HANDLEY PAGE.

Witnesses:
 THOMAS WILLIAM ROGERS,
 WILLIAM A. MARSHALL.